United States Patent [19]

Faugeras

[11] Patent Number: 4,531,205
[45] Date of Patent: Jul. 23, 1985

[54] OPTOELECTRONIC METHOD OF READING DATA ON A MAGNETIC MEDIUM AND CIRCUIT FOR PERFORMING SAID METHOD

[75] Inventor: Philippe Faugeras, Boulogne, France

[73] Assignee: Cii Honeywell Bull (Societe Anonyme), Paris, France

[21] Appl. No.: 490,127

[22] Filed: Apr. 29, 1983

[30] Foreign Application Priority Data

May 14, 1982 [FR] France ............................ 82 08406

[51] Int. Cl.³ ............................................. G11B 11/10
[52] U.S. Cl. ..................................... 369/13; 369/110; 369/46; 360/114
[58] Field of Search .................. 360/114; 369/13, 110, 369/46, 100

[56] References Cited

U.S. PATENT DOCUMENTS

4,198,701  4/1980  Reddersen et al. ................. 365/127
4,245,233  1/1981  Lohstroh ............................. 307/311

Primary Examiner—Raymond F. Cardillo, Jr.
Assistant Examiner—Alyssa H. Bowler
Attorney, Agent, or Firm—Kerkam, Stowell, Kondracki & Clarke

[57] ABSTRACT

Optoelectronic method of reading the data retained on a magnetic medium (SM) on a plurality of tracks, receiving the data in the form of a plurality of luminous spots ($ID_j$) projected onto a plane (P) where there are arranged a plurality of photoelectronic transducers aligned in at least one row ($BTRPE_{ijl}$), at least two transducers ($TRPE_{ij}$, $TRPE_{(i+1)j}$) being associated with the same spot. A specified sampling instants the electrical image of the portion of the observed track is obtained in the form of a plurality of analog pulses ($S'TRPE_{ij}$, $S'TRPE_{(i+1)j}$) which are shifted in parallel, are then transferred into a register where they are shifted in series until an analog output signal ($SSR_1$) is obtained, after which they are converted into a logic signal having a frequency equal to the frequency ($f_E$) for writing the data on the magnetic medium SM.

5 Claims, 15 Drawing Figures

SENSE OF ROTATION OF THE DISC

OPTOELECTRONIC METHOD OF READING DATA ON A MAGNETIC MEDIUM AND CIRCUIT FOR PERFORMING SAID METHOD

BACKGROUND OF THE INVENTION

1. Field of the Invention

The present invention relates to an optoelectronic method of reading data retained on a magnetic medium and the circuit for performing said method. It is particularly applicable to magneto-optical storages mainly utilized in data processing systems.

2. Description of the Prior Art

It is known that data processing systems essentially comprise a central data processing unit (CPU) and a plurality of data input/output units, generally referred to as "peripheral systems". These systems enable data to be entered into the central processing unit where the data is processed by arithmetic and logic units and are then fed back into the output units after processing. The result of the operations is produced by the central processing unit and is then used and analyzed immediately by the user of the data processing systems, or stored for variable periods of time in storages, such as a "mass or bulk storage".

Among the bulk storages currently in use, the magnetic disc storages are the most frequently employed.

In magnetic disc storages the data is carried by magnetic discs and is retained within concentric circular recording tracks. Usually, a string of magnetic data recorded on a disc track presents itself in the form of a succession of small magnetic domains called "elementary domains" distributed throughout the length of the track and having magnetic inductions with the same modulus and of opposite direction.

The present tendency in the evolution of disc storages is to increase both the longitudinal and radial densities of the data. Longitudinal (or linear) density is defined as the number of data per unit of length measured according to the circumference of a track, while radial density is defined as the number of tracks per unit length measured according to the diameter of a track. Magnetic disc storage of the magneto-optic type represent interesting solutions, because the radial and longitudinal densities obtained are of the order of, respectively, 10,000 tracks per cm (25,000 tracks per inch, or 25,000 tpi) and 10,000 bits per cm (or 25,000 bits per inch, or 25,000 bpi). The word "bit" designates at the same time the binary unit of data which is equal to 1 or 0 and any representation of said information which may, for example, be a magnetic elementary domain retained on a magnetic-disc track or an electrical analog or logic signal. Thus, in magneto-optic storages the dimensions of the elementary magnetic domains are of the order of 1 to 2 microns, and the width of the tracks is of the same order of magnitude.

In magneto-optic storages, writing is performed by devices which are for the most part magnetic, while the reading is performed by an optoelectronic device comprising an assembly of optical means and photoelectronic transducers which convert the light they receive into an electrical signal. In other words, magneto-optic storages are storages where the data is carried by magnetic discs and read by optoelectronic devices.

In magneto-optic storages, the reading mode of the data is based on the principle of interaction of a polarized light with the magnetic state of the layer constituting the magnetic disc, which interaction results in the rotation of the electric-field vector in the plane perpendicular to the direction of propagation (and, thereby, of the magnetic field of the electromagnetic radiation constituting the polarized light).

It will be recalled that an electromagnetic radiation (or, by extension, light) is polarized rectilinearly in the plane where the electric-field vector (and, thereby, the magnetic-induction vector) always keeps the same direction in the plane perpendicular to the direction of propagation of the radiation regardless of the position of said plane in space, and regardless of the instant of observation. The polarization plane is defined as the plane which contains the direction of propagation of the light, and the electric-field vector.

Optoelectronic devices for reading data retained on a magnetic medium that use the interaction principle mentioned above are old in the art. Such a device is, for example, described in French Patent Application No. 81 19543 filed on Oct. 16, 1981 by the applicant and entitled "Optoelectronic Device for Reading Data Retained on a Magnetic Medium" (U.S. Ser. No. 417,904, filed Sept. 14, 1982). The principle of such a device is to send to the surface of the disc a normal, relatively monochromatic, light beam whose diameter is such that it permits observation of a plurality of tracks (of the order of from one dozen to several dozens), and to each track a plurality of magnetic domains, and to project the image of the disc surface, which is illuminated by the light beam, onto a plane where a plurality of photoelectronic transducers are arranged. If the magnetic medium of the magnetic layer, which magnetization is perpendicular (one could also use a magnetic medium whose magnetization is longitudinal, i.e., parallel, to the layer), it will be observed that, following the reflection of the incident beam on said layer and for each magnetic domain, the electric-field vector of the incident light undergoes a rotation in the plane which is normal to the direction of propagation of the light which, by convention is said to be equal to an angle $(-\theta)$ when the light beam encounters a domain with negative magnetization and which is equal to an angle $(+\theta)$ when the incident light beam encounters a domain with positive magnetization. This physical phenomemon which has just been described (the interaction of the incident light with the magnetic state of the material which results in a rotation of the magnetic-field vector and of the electric-field vector) is called "Kerr-effect".

Thus, in order to determine the value of a bit, it is sufficient to detect the rotation of the electric-field vector. This is done by means of an "analyzer" formed by a crystal which overrides a direction of propagation of the light and which is placed in such a way that said direction is at right angles to the direction assumed by the electric-field vector of the reflected light when the latter is reflected on a magnetic domain with negative magnetization. Under these conditions, a light with zero intensity is collected at the output of the analyzer. By contrast, when the light is reflected on a magnetic domain with positive magnetization, a light with non-zero intensity is observed at the output of the analyzer. In other words, the domains with negative magnetization will appear in black on the plane where the photoelectronic transducers are arranged, which planes are situated at the output of the analyzer, while the domains with positive magnetization will appear in white. Thus, one sees that the image of the surface of the disc which is lit by the beam with a diameter D which is projected onto the plane, is formed by a group of luminous dark and white spots, depending on the value of the data bits registered on each track of the magnetic disc.

More specifically, the optoelectronic device whose operating principle has been recalled hereinabove comprises:

a source transmitting a polarized light beam sent to the surface of the data medium at a location determined by the latter and whose interaction with the magnetic state of the data medium at said location produces a rotation of the plane of polarization of the light;

means for detecting the angle of rotation of said plane, comprising a light analyzer, and optoelectronic transducers which generate an electric signal whose voltage (or current) is a function of a value of the data retained at said location, and is characterized in that it comprises:

optical means for focussing a light beam with a large field of observation to permit the simultaneous observation of a plurality of tracks and a plurality of data on each track; and means for projecting the image of the surface of the data medium observed by the objective onto a plane P where the optoelectronic transducers are located.

SUMMARY OF THE INVENTION

The present invention relates to an optoelectronic reading method and to a circuit for performing this method to enable the luminous spots to be converted into a logic signal comprising a plurality of bits, each of which corresponds to a luminous spot, said signal, which is generated by the circuit, having a frequency which is equal to the frequency for writing magnetic data on the disc and thus capable of being processed by the arithmetic and logic units of the central processing unit of the data processing system with which the magneto-optic storage containing the disc is associated.

The assembly of photoelectronic transducers is arranged in such fashion that the transducers are aligned in at least one row and their active surface is such that it is smaller than the size of the spots, such that a large number of photoelectronic transducers can be utilized. This enables the same information to be read several times. It can be said that the reading principle of the circuit makes use of redundancy. This method of operation very substantially improves the signal/noise ratio and reduces the error rate (i.e., the number of reading errors in relation to the total number of data read).

The principle of the method and of the circuit for performing the method is to obtain by means of photoelectronic cells the electrical image of a track portion, then shift the data obtained into serial and parallel registers, and to store them temporarily in said registers prior to transmission to a group of circuit elements to enable the analog data received at the output of the serial register to be converted into a group of logic pulses whose frequency is equal to the frequency for writing the data on the disc.

According to the invention, the optoelectronic method for reading data retained on a magnetic medium within a plurality of discs comprises receiving the data in the form of a plurality of luminous spots whose intensity is a function of the value of the data and which are supplied by an optical device which observes simultaneously a plurality of tracks and a plurality of data on each track of the data medium, projecting an enlarged image in the form of a group of spots onto a plane where there are arranged a plurality of photoelectronic transducers aligned in at least one row, and whose output voltage (or current) is a function of the intensity of the spots, and is particularly characterized in that (at least two cells being associated with one spot) it comprises the following phases:

(1) obtaining at specified sampling instants determined by means of transducers in the row the electric image of the track portion observed by the optical device at these same instants in the form of a plurality of analog data;

(2) analog pulses shifted into a parallel register;

(3) transferring the data from the parallel register into a serial shift register;

(4) shifting the data until all have left the serial register; and (5) converting the analog signal generated by the serial register at a frequency $f_1$ into a logic signal whose frequency is equal to the frequency $f_E$ for writing the magnetic data on the tracks of the magnetic medium.

The circuit for performing the method according to the invention allows the reading of data retained on a magnetic medium within a plurality of tracks. The data is received in the form of a plurality of luminous spots whose intensity is a function of the value of the data and are supplied by an optical device which observes simultaneously a plurality of tracks and a plurality of data on each track of the data medium. An enlarged image is projected in the form of a group of spots onto a plane where there are arranged a plurality of photoelectronic transducers which are aligned in at least one row and whose voltage (or current) output is a function of the intensity of the spots. The invention is particularly characterized in that (at least two cells being associated with one spot) it comprises:

a parallel-transfer register for the signals generated by the group of transducers;

a serial-shift register containing at least as many storage locations as there are transducers and which receives the data sent by the parallel-shift register;

a clock for controlling the two registers and which operates at frequency $f_d$;

a device for amplifying the analog signal generated by the serial-shift register; and means for converting the analog signal generated by the amplifying device into a logic signal comprising bits of logic data at a frequency which is equal to the frequency $F_E$ for writing the data on the magnetic medium.

BRIEF DESCRIPTION OF THE DRAWINGS

Other features and advantages of the present invention will become apparent to one skilled in the art from the following description given by way of non-limitative example, reference being had to the accompanying drawings, in which:

FIG. 1, composed of FIGS. 1a, 1b, 1c, can be used to discuss the principles of composition and operation of an optoelectronic device for reading data retained on a magnetic medium such as that described in French Patent Application No. 81.19543 Ser. No. 417,904) mentioned above;

DESCRIPTION OF THE PREFERRED EMBODIMENTS

For a better understanding of the principles governing the composition and operation of the electronic circuit which performs the magneto-optic method of reading data retained on a magnetic medium according to the invention, it will be helpful to recall a few details concerning optical devices for reading magnetic data retained on a magnetic medium (e.g., a magnetic disc), such as the device described in the patent application mentioned above.

In the description below, it will be assumed that the magnetic medium whose data are sought to be read is a magnetic disc DISC.

Figure 1A:
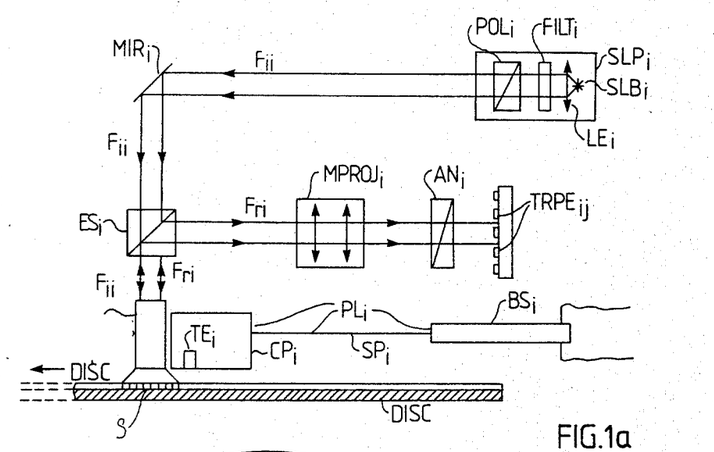
FIG. 1a shows a preferred embodiment of this device, which is placed on a platform carrying a main body containing a transducer for writing data retained on the magnetic medium.

The various main constituent elements of the optical reading device shown in FIG. 1a include:

a source of polarized light $SLP_i$, a separator element $ES_i$ for the incident beam $F_{ii}$ and for the reflected beam $F_{ri}$, a magnifying optical device OBJGROS which permits the illumination of the magnetic layer CM of the disc DISC on a surface S in such a way that several tracks (at least one dozen) and a plurality of magnetic domains within each track are observed simultaneously, a projecting means $MPROJ_i$, a light analyzer $AN_i$, a projection plane P onto which is projected the image of the surface illuminated by the incident beam $F_{ii}$; an image obtained by the projecting means $MPROJ_i$, the analyzer $AN_i$ being arranged between the projecting means and the plane P, and a group of photoelectrical transducers $TRPE_{ij}$ which generates a group of electric signals that correspond to the various magnetic domains of the disc DISC observed within the surface illuminated by the incident light beam $F_{ii}$.

The source of polarized light $SLP_i$ transmits an incident parallel light beam $F_{ii}$. This light is relatively monochromatic and can be coherent or non-coherent.

The incident beam $F_{ii}$ passes through the separator element $ES_1$ and is sent through the magnifying optical system OBJGROS in a direction normal to the surface of the magnetic layer CM of the disc DISC. The surface S thusly illuminated is substantially circular. Depending on the magnification of the optical system OBJGROS, a surface can be observed whose diameter ranges between approximately 10 and 500 microns. Thus, several dozens (even hundreds) of tracks can be observed, and several dozens (even hundreds) of magnetic domains within each track.

The reflected beam $F_{ri}$ passes successively through the optical system OBJGROS, the separator element $ES_i$, prior to traversing the projecting means $MPROJ_i$. The light of the reflected beam $F_{ri}$ then passes through the analyzer of the polarized light $AN_i$ prior to being projected onto the plane P where the photoelectric transducers $TRPE_{ij}$ are arranged.

Thus, on the plane P an image of the surface S is obtained which is viewed through the optical system OBJGROS, the separator element $ES_i$, and the projecting means $MPROJ_i$. Suppose IS is this image of the surface S shown in FIG. 1c. This image is thus a real image of the field of the data read within the surface S observed thorugh the optical system OBJGROS. Dependent upon the magnification g of the optical assembly formed by the optical system OBJGROS and the projecting means $MPROJ_i$, luminous spots can be obtained that correspond to the magnetic domains contained within the tracks of the disc DISC with a diameter of several hundreds of a micron. These spots appear, for example, in white if they correspond to magnetic domains with positive magnetization, and in black if they correspond to domains with negative magnetization. It will be recalled that, in accordance with the writing code utilized for recording the data on the disc DISC, the value of the data can, for example, depend on the dimensions of the magnetic domains and, owing to the dimensions of the corresponding luminous spots or to the distance separating two different adjoining magnetic domains, on the distance separating the luminous spots (images) from these adjoining magnetic domains.

Thus, the dimensions of these luminous spots is perfectly compatible with the dimensions of the photoelectric transducers found in current practice.

Thus, one can arrange on the plane P in a direction OY, which correpsnds to a radius of the disc, a plurality of photoelectric transducers (called "photosensitive cells" which are usually semiconducting photodiodes) and whose pitch PI is equal to the pitch of the image $ITR_j$ of the tracks viewed within the surface IS (see FIG. 1c). Thus, it is possible to read several tracks simultaneously. On the other hand, if one arranges on this plane P an array of photodiodes set in the direction of an OX-axis perpendicular to the OY-axis, that is to say, in a direction that corresponds to the tangent line to the disc tracks, it is possible to reread the same informatioon several times. Thus, an array of photodiodes can be placed on the plane P whose pitch in the direction of the OY-axis is equal to the pitch PI and whose pitch in the direction of the OX-axis corresponds to the distance between the images $ID_i$ of the magnetic domains of each of the tracks. This pitch is equal to the distance, for example, between two successive images $ID_i$ and $ID_{i+1}$ shown in FIG. 1c. Thereby, if one places at the output of the group of transducers $TRPE_{ij}$ an electronic logic circuit, making use of the redundancy of the data, that is to say, the fact that the information is read several times (at least twice), one would increase very substantially the signal/noise ratio in relation to the signal/noise ratio which would be obtained if there were only one transducer. Indeed, if at the output of a single transducer a signal is collected having an amplitude S which corresponds to a given unit of data (a luminous spot) and a noise B, and if the same information is read n times by summing up the group of corresponding signals, a signal S will be obtained at the output of the adder even when the noise is equal to B', considerably less than B. The signal/noise ratio obtained is thus $ns/B' > S/B$. It is precisely the object of the electronic circuit according to the invention to use the principle of the redundancy of information in order to improve the signal/noise ratio.

It will be noted that the various constituent elements of the source of polarized light $SLP_i$ are the source of white light $SLP_i$ and a lens $LE_i$ which forms a parallel beam of light which passes through the filter $FILT_i$ prior to traversing a polarizer $POL_i$.

The projecting means $MPROJ_j$ are, for example, made up of a group of lenses.

The preferred embodiment of the optical reading device shown in FIG. 1a is placed on a movable platform, permitting it to move with respect to the group of disc tracks so as to be able to observe the latter. This platform $PL_i$ comprises a supporting arm $BS_i$ fixed by one of its ends, for example, to, a movable carriage outside the disc DISC (not shown so as not to clutter FIG. 1a), and whose other end is integral with a suspension spring $SP_i$ carrying a main body $CP_i$. The latter contains, for example, an electromagnetic transducer for reading data on the magnetic disc denoted $TE_i$.

The source $SLP_i$ is often located outside the platform and is fixed. In this case, it is necessary to place on the platform $CP_i$ a mirror $MI_i$ to receive the beam $F_{ii}$ emitted by the source $SLP_i$ in order to send it to the optical system OBJGROS by means of the separator element $ES_i$.

Figure 1B:
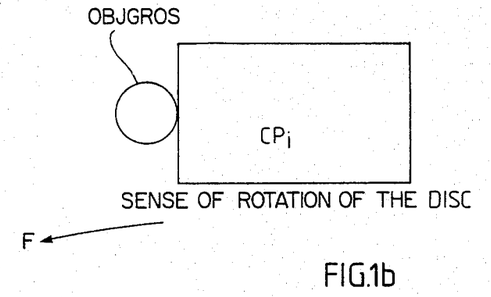
FIG. 1b shows the relative arrangement of the other magnifying objective of the photoelectronic reading device and the main body containing the transducer for writing data on the magnetic medium.
Figure 1C:
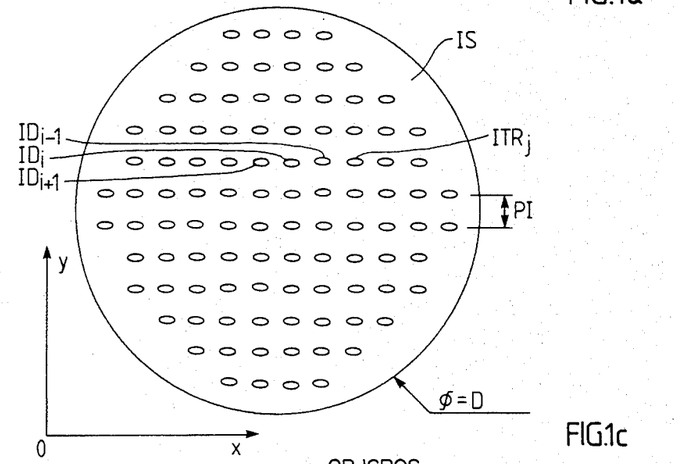
FIG. 1c shows the image of the surface of the magnetic medium observed by the magnifying objective of the photoelectronic transducers for reading data retained on the magnetic medium are arranged.

FIG. 1b is a top view of the main body $CP_i$ and of the optical system OBJGROS which accurately shows the relative arrangement of these two elements, the direction of rotation of the disc being indicated by the arrow F.

Figure 2:
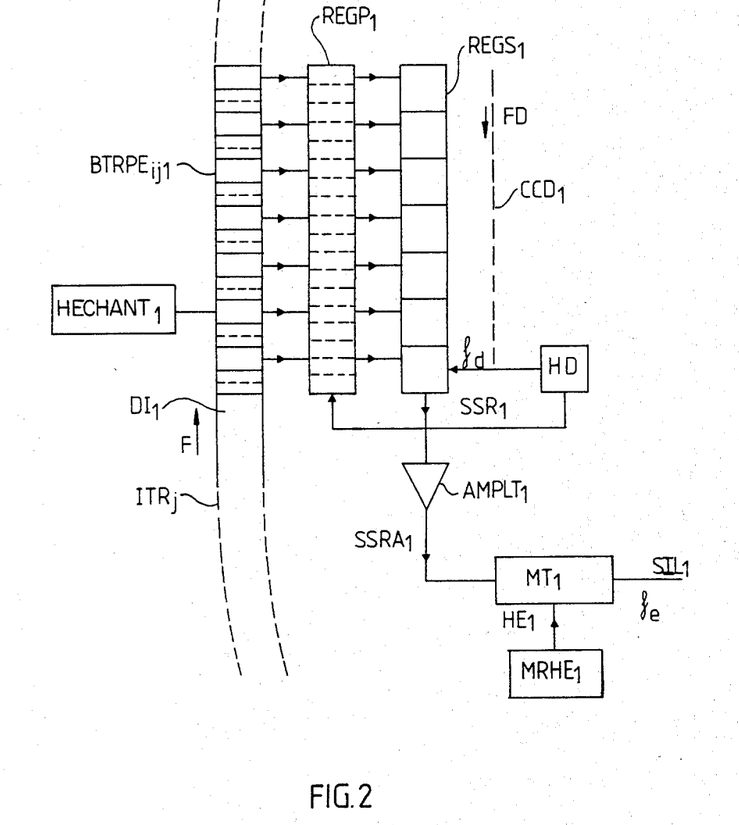
FIG. 2 shows the main constituent elements of the electronic circuit for reading data for performing the method of photoelectronic reading of data retained on the magnetic medium according to the invention.

Now, referring to FIG. 2, where the various essential constituent elements of the electronic reading circuit are illustrated which are designed for performing the method of reading data retained on a magnetic medium according to the invention.

These various essential constituent elements comprise: the array of photoelectronic transducers $BTRPE_{ij1}$ containing a plurality of aligned photoelectronic transducers. To simplify the description that follows, it is assumed that the electronic circuit comprises only one array of photoelectronic transducers, but it will be understood that the electronic circuit of the invention may comprise a plurality of arrays which are parallel to, and separated from, one another by a distance which is equal to the pitch PI of the images of the magnetic tracks obtained on the plane P. It is obvious that the fact that one or more arrays are used does not alter the principles of composition and operation of the device according to the invention. The elements further comprises:

the parallel shift register $REGP_1$ containing as many storage locations as the array $BTRPE_{ij1}$ contains photoelectronic transducers, the serial shift register $REGS_1$ which contains as many storage locations as the register $REGP_1$, its direction of shift being indicated by the arrow FD in FIG. 2, the amplifier AMPLI which amplifies the signal $SSR_1$ generated by the serial register $REGS_1$ and generates the signal $SSRA_1$, the means $MT_1$ for converting the analog signal $SSR_1$ generates by the amplifier $AMPLI_1$ at a frequency $f_1$ into a logic signal whose writing frequency is equal to the frequency for writing the magnetic data recorded on the tracks of the magnetic disc DISC, the shift clock $HD_1$ which supplies a logic signal whose frequency $f_d$ establishes the rate of the shift of the data from the parallel register to the serial register, on the one hand, and from one storage location of the serial register to the adjoining location of this same register, on the other, a sampling clock $HECHANT_1$ which generates a sampling signal and enables the photoelectronic transducer of the array $BTRPE_{ij1}$ to take, at sampling instants determined by the frequency of the sampling signal, the electric image of the portion of the track observed by the optical device at these same instants, and the means for recovering the write clock $MRHE_1$ which, by means of a converting means $MT_1$, generates a logic frequency signal which is equal to the writing frequency $f_E$ of the magnetic data on the tracks of the disc DISC.

The array of photoelectronic transducers $CTRPE_{ij1}$ may comprise a considerable number of photosensitive elements (transducers), said number being capable of reaching 2,000, for example.

These photoelectronic transducers can have a weak active surface, say, of the order of 150 to 200 $\mu m^2$, i.e., the surface of a square measuring $12 \times 15$ microns.

These various photosensitive elements are aligned in a direction parallel to the OX-axis, i.e., to the tangent at a given point on the image $ITR_j$ of a track with the sequence number j of the disc DISC. As can be seen in FIG. 2, the array is located opposite the image $ITR_j$ of any track $TR_j$ of the disc DISC, the direction of motion of the data being indicated by the arrow F.

Figures 3, 3A, 3B:
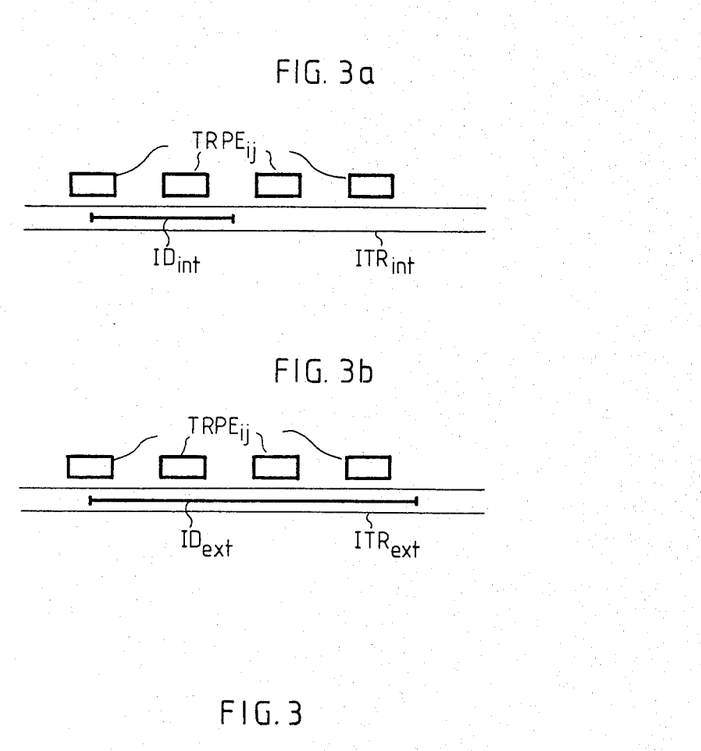
FIG. 3 made up of FIGS. 3a and 3b, shows the relative space required for the image of the data bits which is recorded on the magnetic medium, images projected onto the plane P, the photoelectronic reading transducers arranged on this same plane P, depending on whether the images of said data bits correspond to the data recorded on the internal track of a magnetic disc (this disc is the magnetic medium mentioned above) or to the data recorded on the external track (the data which is retained on the periphery of the magnetic disc)

The magnification of the optical system of the optical reading device (objective OBJGROS, projecting means $MPROJ_j$) will be such that the image $ID_i$ of a magnetic domain will have at least the length of two photosensitive elements of the array $BTRPE_{ij1}$, which means that, regardless of the position of the image $ID_i$ of a magnetic domain with respect to the photoelectronic transducer, there will always be at least one transducer whose active surface will be entirely exposed to the luminous radiation of said image. To this end, reference should be had to FIGS. 3a and 3b. For a better understanding of these figures, it is necessary to bear in mind that the writing of data on the magnetic disc DISC is performed at a constant frequency $f_E$, which means that the number of magnetic domains recorded on each track of the magnetic medium formed by the magnetic disc DISC is identical from one track to another. Thus, the length of a magnetic domain measured in a direction parallel to the tangent to the disc track to which it pertains will depend on this same track. Thus, the magnetic domains recorded on the inner track of the disc will be much smaller than the magnetic domains recorded on the outer track.

It is obvious that this variation of the length of the magnetic domains is reproduced at the level of the images of these same domains. This is readily apparent from FIGS. 3a and 3b. Thus, two transducers $TRPE_{ij}$ are associated with the image $ID_{int}$ of a magnetic domain pertaining to the image $ITR_{int}$ of an inner track of the disc, whereas four transducers $TRPE_{ij}$ are associated with the image $ID_{ext}$ pertaining to the image $IDR_{ext}$ of a track of the outer track. Thus, the number of transducers associated with the image of a magnetic domain varies as a function of the disc track which is read. The parallel register $REG_1$ contains as many storage locations as the array $BTRPE_{ij1}$ contains photoelectronic transducers.

The time $T_d$ required for shifting the data retained in the register $REGP_1$ to the serial register $REGS_1$ and from a storage location of the serial register $REGS_1$ to the storage location immediately adjoining is the same. It is determined by the frequency $f_d$ of the clock signal supplied by the clock $HD_1$. THe constructional details concerning the means $MT_1$ for converting the analog signal generated by the amplifier $AMPLI_1$ into the logic signal $SIL_1$, as well as the means $MRHE_1$ for restituting the write clock signal $HE_1$ will be detailed hereinbelow.

In one preferred embodiment of the circuit for reading the data retained on a magnetic medium according to the invention, the elements $BTRPE_{ij1}$, $REGP_1$, $REGS_1$, $HD_1$ and $AMPLI_1$ form part of a charge-transfer device array called C.C.D. manufactured, for example, by Fairchild Camera and Instruments (France F.A. 121, Avenue d'Italie 75013—Paris) and are, for example, described in "Micro Systeme", September-October 1981, pp. 189-197. It will be recalled that the technology of charge-transfer devices permits, with the aid of shift registers, the handling of analog signal (via delay lines, temporary storage, etc.). They are essentially made up of a row of photosensitive elements (in the circuit of the invention they form the array of photoelectronic transducers $BTRPE_{ij}$), two analog shift registers (in this case, the registers $REGP_1$ and $REGS_1$) and an output amplifier (in this case, the amplifier $AMPLI_1$). Their operating principles are extremely simple. When a luminous ray falls on each of the photosensitive elements, the latter generate electrical charge packages in proportion to the energy they receive. The electrical charges are then transferred parallel to the first register, then in series with the second register. This shift occurs thanks to the external clock.

It will now be easier to understand the operation of the electronic circuit for data recorded on a magnetic medium according to the invention such as depicted in FIG. 2 by describing the reading process it performs.

This process comprises the following successive phases:

First phase: at specified sampling instants, by means of different cells of the array $BTRPE_{ij1}$, the electrical image of the track portion observed at these same instants by the optical device illustrated in FIG. 1 is obtained in the form of a plurality of analog pulses. The sampling instants are, for example, provided by the leading edge of the logic pulses equal to 1 of the signals provided by the sampling clock $HECHANT_1$. At these instants, each of the cells of the array $BTRPE_{ij1}$ generates an analog pulse whose voltage (or current) is a function of the luminous intensity of the portion of the luminous spot located opposite said cell at said sampling instant (It will be recalled that two to four cells are associated with the same luminous spot, depending on whether one observes a track situation within the disc or on the periphery thereof.

Second Phase: The analog pulses generated by each of the cells of the array $BTRPE_{ij1}$ is shifted in the parallel shift register $REGP_1$. This means that, as soon as each of the photoelectronic cells (photoelectronic transducers) has obtained the electronic image corresponding to the portion of the luminous spots located on the opposite side, the corresponding analog pulse is transmitted in the pocket of the parallel register $REGP_1$ corresponding to said cell.

Third Phase: The data retained in the register $REGP_1$ are transferred to the serial shift register $REGS_1$. If $f_d$ is the frequency of the signal provided by the shift clock $HD_1$, this transfer time is equal to $T_d = 1/f_d$.

Fourth Phase: These data, namely, the analog pulses coming from the array of photoelectronic transducers are shifted by means of the parallel register $REGP_1$ in the direction of the arrow FD to the output of the serial register. The latter generates a signal $SSR_1$, each analog pulse of which has the shape shown in FIGS. 6a and 6b, said shape depending on the track of the disc the optical device is in the process of observing and, thereby, the image of said track.

Figure 6A:
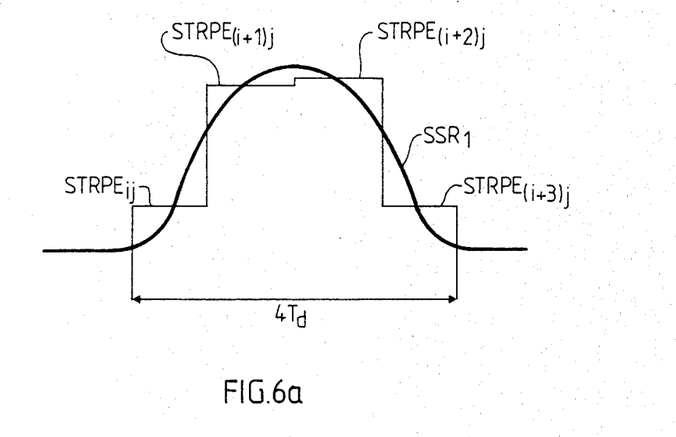
FIG. 6, made up of the graphs of FIGS. 6a and 6b, shows how the output signal generated by the parallel register of the circuit according to the invention depends on the track of the disc which is observed by the optical reading device thereof.

Now referring to FIG. 6a, this figure has the form of an analog pulse of the signal $SSR_1$ when the track observed by the optical device is the outer track. It will be recalled that in this case there are associated with one luminous spot four photoelectronic transducers, namely, for example, the transducers $TRPE_{ij}$, $TRPE_{(i+1)j}$, $TRPE_{(i+2)j}$, $TRPE_{(i+3)j}$. These transducers generate, respectively, the analog pulses $STRPE_{im}$, $STRPE_{(i+1)j}$, $STRPE_{(i+2)j}$, $STRPE_{(i+3)j}$. It is obvious that these four signals are generated simultaneously by the four corresponding photoelectronic transducers and are transmitted simultaneously by the register $REGP_1$ to the register $REGS_1$. However, by the mere fact that the register $REGS_1$ is a serial shift register, the four signals in question exit from the register $REGP_1$ one after the other with a shift time between two consecutive signals equal to $T_d$. This is readily apparent from FIG. 6a. For the sake of convenience, in this same figure one of analog pulses is shown in the form of a substantially rectangular pulse whose voltage (current) is equal to the mean value of the voltage of the analog pulse. At the output of the register, the signal $SSR_1$ has the shape of an analog pulse which is the summation of the four analog pulses $STRPE_{ij}$ to $SRPE_{(i+3)j}$. The duration of the pulse $SSR_1$ is equal to four $T_d$.

Figure 6B:
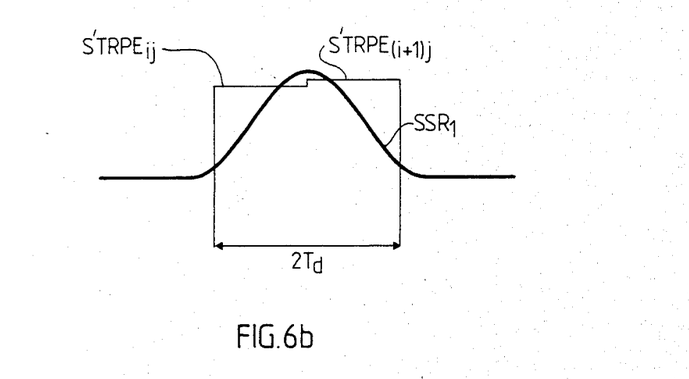

Let us now consider FIG. 6b and the two signals $S'TRPE_{(i+1)j}$ generated, respectively, by the two photoelectronic transducers $TRPE_{ij}$ and $TRPE_{(i+1)j}$, which, in this case, are associated with a luminous spot representing a bit of information of the inner track of the disc DISC.

It can be seen that the analog pulse of the signal $SSR_1$ then has a duration equal to $2T_d$. It is obvious that the signal $SSR_1$ results, as has previously been indicated for FIG. 6a, from the summation of the two signals $S'TRPE_{ij}$ and $S'TRPE_{(i+1)j}$.

An examination of FIGS. 6a and 6b permits one to draw the following conclusions:

Regardless of the track observed by the optical reading device, the output signal $SSR_1$ of the register $REGS_1$ has a period which is (two to four times) larger than the shift period $T_d$ of the signal provided by the shift clock $HD_1$. Consequently, the frequency of the signal $SSR_1$ is always smaller than the shift frequency $f_d$. Let $f_1$ be this frequency. This frequency $f_1$ depends on the track to be observed. This frequency increases when one moves from the outer track to the inner track.

Fifth Phase: The analog signal $SSR_1$ generated by the serial register $REGS_1$ is converted at a frequency $f_1$ is converted into a logic signal whose frequency is equal to the write frequency $f_E$ of the magnetic data on the tracks of the magnetic disc DISC. This conversion of the signal $SSR_1$ into a logic signal $SIL_1$ with a frequency $f_E$ is performed by the converting means $MT_1$ controlled by the means for restituting the write clock $MRHE_1$ which provides the write clock signal $HE_1$ to these same means $MT_1$.

By examining the five phases of the reading process, it will be seen that the total time for reading a package of N bits of information appearing in the form of N luminous spots on the plane P via the reading circuit according to the invention is constant: indeed, if T denotes the total time for reading the package of N information bits via the reading circuit, one can write:

$$T = \tau + T_1 + T_2$$

wherein:

$\tau$ is the time for obtaining N reading signals generated by the photoelectronic transducers $TRPE_{ij}$, said reading signals corresponding to N luminous spots;

$T_1$ is the time for transferring said signals to the serial shift register $REGS_1$. This time $T_1$ is slightly larger than $T_d$ because it includes an extremely short time required for transferring the signals generated by the arrays into the parallel shift register $REGP_1$;

$T_2$ is the shift time needed to transfer all of the data retained in the serial register to the output thereof. This time $T_2$ is equal to as many times the shift time $T_d$ as there are storage locations, because it must be expected that all of the data, including those contained in the storage location which is the farthest away, find their way to the output thereof.

Thus, since each of the factors $\tau$, $T_1$, $T_2$ whose sum constitutes the total duration T for reading a package of N information bits, is constant, the time T is constant as well.

Figure 4A:
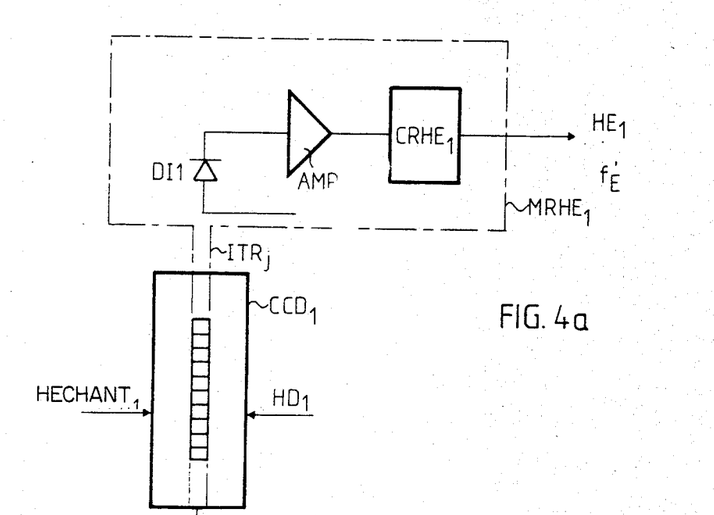
FIGS. 4a and 4b are preferred embodiments of the photoelectronic circuit for reading data retained on a magnetic disc, according to the invention.

Now, referring to FIG. 4a which depicts a preferred embodiment of the means for restituting of the clock $MRHE_1$.

The various constituent elements of these means $MRHE_1$ comprise the photosensitive diode $DI_1$, the amplifier $AMP_1$ and the circuit restituting the write clock $CRHE_1$.

The photosensitive diode $DI_1$ is located in the extension of the array of transducers $BTRPE_{ij1}$ ahead thereof in the manner shown in FIG. 2. In FIG. 2, the photosensitive diode $DI_1$ is symbolized by a small rectangle indicated by broken lines. It can be seen that because of the relative position of the diode $DI_1$ and of the array $BTRPE_{ij1}$, the photodiode $DI_1$ will see over time the luminous spots move before the array.

The cicuit $CRHE_1$ is a phase locked loop of the type manufactured by MOTOROLA SEMICONDUCTOR PRODUCTS, INCORPORATED and described in MOTOROLA application sheet AN-535 entitled "Phase-locked loop design fundamentals".

The photodiode $DI_1$ generates an analog pulse as soon as a luminous spot moves past it; this pulse is amplified by the amplifier $AMPL_1$ before being transmitted to the phase-locked loop $CRHE_1$ which converts said string of analog pulses into a clock signal $HE_1$ with a frequency $f_E$.

Figure 4B:
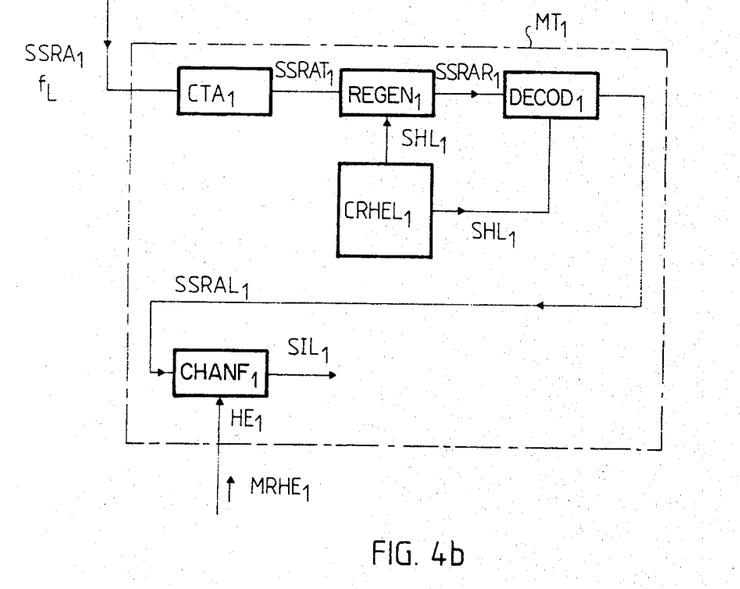

Now referring to FIG. 4b, which shows the constructional details of the converting means $MT_1$.

The various essential constituent elements of the converting means $MT_1$ comprise the analog processing circuit $CTA_1$, the regenerator $REGEN_1$, the decoder $DECOD_1$, the circuit for restituting a clock signal whose frequency is equal to that of the signal generated by the register $REGS_1$ and the frequency-changing circuit $CHANF_1$.

The analog processing circuit $CTA_1$ receives the signal $SSRA_1$, filters said signal, equalizes and amplifies it. Thus, an analog, equalized and filtered signal $SSRAT_1$ is obtained at the output of the circuit $CTA_1$ with a frequency $f_1$.

This signal $SSRAT_1$ is sent to the regenerator $REGEN_1$ which is a threshold decision circuit which converts the analog pulses of the signal $SSRAT_1$ into equal logic pulses of 1 or 0. Said regenerator operates at a frequency rate $f_1$ provided by a clock signal $SHL_1$ generated by the circuit CRHEL, which is quite similar to the circuit $CRHE_1$ described hereinabove.

The signal generated by the regenerator $REGEN_1$, namely $SSRAT_1$, is sent to the decoder $DECOD_1$ which converts this signal into a logic signal $SSRAL_1$ with a frequency $f_1$. This signal $SSRAL_1$ is a logic signal whose code is similar to the writing code of the data recorded on the disc DISC.

In order for the signal $SSRAL_1$ to be read and processed properly by the reading circuits of the central processing unit of the data processing system to which magnetooptic memory containing the disc DISC belong, it is fitting to convert it into a signal $SIL_1$ with a frequency $f_E$.

The object of the circuit $CHANF_1$ is to convert the signal $SSRAL_1$ having a frequency $f_1$ into a signal with a frequency $f_E$. The frequency-changing circuit $CHANF_1$ is controlled by the clock signal $HE_1$ having a frequency $f_E$ generated by the means for restituting the clock $MRHE_1$ described earlier.

Figure 5:
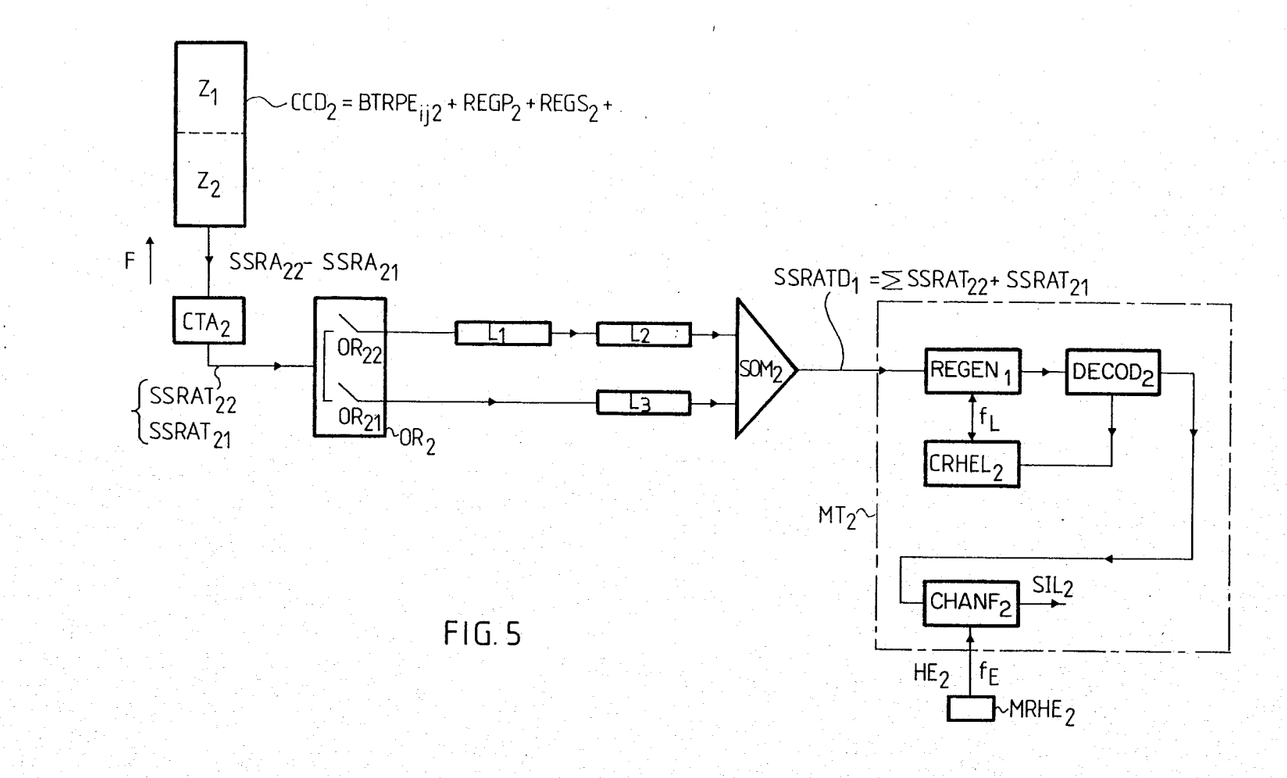
FIG. 5 shows a second preferred embodiment of the photoelectronic circuit for reading data retained on a magnetic medium according to the invention, said circuit utilizing the principle of reading data by redundancy.

Now, referring to FIG. 5 which represents a preferred embodiment of the reading circuit which performs the method of the invention, the embodiment which utilizes the reading principle by redundancy. This redundance is realized in order to read twice the same package of N bits recorded on the magnetic disc DISC and, thereby, to read twice the same package of corresponding N images projected onto the plane P.

The various essential constituent elements of this preferred embodiment of the reading circuit according to the invention comprise: the charge-coupling device $CCD_2$, similar to the charge-coupling device $CCD_1$, the analog processing circuit $CTA_2$, similar to the analog processing circuit $CTA_1$ shown in FIG. 4b, the circuit $OR_2$ made up of two gates $OR_{2.2}$ and $OR_{1.1}$, the three delay lines $L_1$, $L_2$, $L_3$, the analog adder $SOM_2$, the analog converting means $MT_2$ similar to the analog processing circuit except for the converting means $MT_1$, that is to say, comprising a regenerator $REGEN_2$, a decoder $DECOD_2$, a circuit for restituting the reading clock of the registers of the array $CCD_2$, namely, the circuit CRHEL$_2$, a frequency-changing circuit CHANF$_2$ and the clock restitution means MRHE$_2$ which generates a clock signal HE$_2$ with a frequency f$_E$ equal to the frequency for writing the data on the disc DISC, said means MRHE$_2$ being completely identical to the means MRHE$_1$ shown in FIG. 4a.

The array CCD$_2$ is made up of the array CCD$_1$ illustrated in FIG. 2, an array of photoelectronic transducers BTRPE$_{ij2}$, a parallel shift register REGP$_2$, a serial shift register REGS$_2$, and an amplifier AMPLI$_2$.

The array CCD$_2$ is divided into two areas Z$_1$ and Z$_2$. The direction of motion of the data on the disc DISC (and, consequently, on the plane onto which are projected the images of the data on the tracks of the disc DISC) is indicated by the arrow F. If it is assumed that the device CCD$_2$ has 1024 photoelectronic transducers (the registers REGP$_2$ and REGS$_2$ will thus contain 1024 storage locations), the two areas or fields Z$_1$ and Z$_2$ will each contain 512 photoelectronic transducers and 512 storage locations in the registers REGP$_2$ and REGS$_2$. It has been stated hereinabove that four photoelectronic transducers are associated with a magnetic domain of the outer track, whereas two photoelectronic transducers are associated with a magnetic domain recorded on the inner track. Consequently, at the most, (outer track of the disc) a package of data stored in an area A$_1$ or Z$_2$ of the device CCD$_2$ will have the following size: N=512/4=128 data bits.

It is obvious that if the shift frequency f$_d$ is equal to, say, 20 megahertz, the maximum flow (i.e., the maximum frequency of such a reading device comprising two areas Z$_1$ and Z$_2$) will be:

$$f_{max}=20\times 128/1024=2.5 \text{ megahertz.}$$

The operation of the circuit depicted in FIG. 5 is shown in FIGS. 7a, 7b, 7c and 8.

Figure 7A:
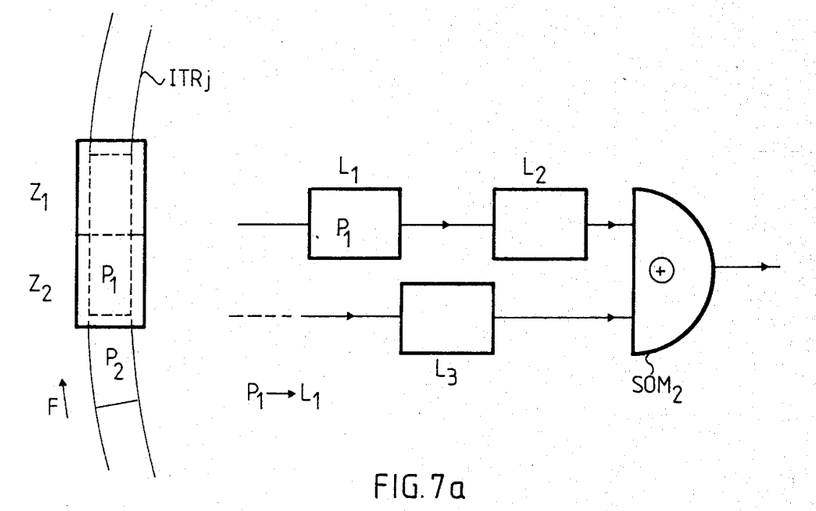
FIGS. 7a, 7b, 7c and 8 show the operating principle of the circuit shown in FIG. 5.

Now, referring to the reading of four successive packages of N bits of any disc track whose image is ITR$_j$, these four packages are denoted P$_1$, P$_2$, P$_3$, P$_4$. The direction of motion of the image ITR$_j$ past the array CCD$_2$ is shown by the arrow F. Hence, the first package of N bits to be read is the package P$_1$. It is first read by the zone Z$_2$ of the array CCD$_2$ (FIG. 7a). This data package P$_1$ is in the delay line L$_1$. If a source of time 0 is considered as being shown in FIG. 8, the reading of the data package P$_1$ takes place between the instant 0 and the instant T, the transfer of the package P$_1$ in the delay line L$_1$ being completed at the instant T. Thus, the delay line L$_1$ contains at least as many storage locations as the area Z$_2$. Hence, the three delay lines L$_1$, L$_2$ and L$_3$ are identical to one another and to the area Z$_2$ or Z$_1$ of the register REGS$_2$.

Figure 7B:
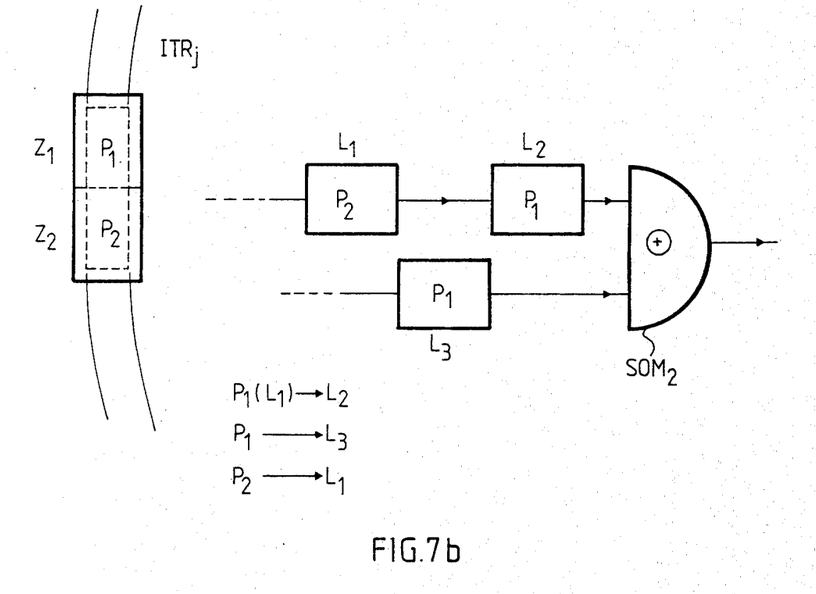

At the sampling instant T, the data package F$_1$ is read by the area Z$_1$, whereas the following data package is read by the area Z$_2$. The collection of these two bit packages by the areas Z$_1$ and Z$_2$ thus occurs between the instants T and 2T. At the instant 2T (FIG. 8), the data package P$_1$ which was retained in the delay line L$_1$ is transferred into the delay line L$_2$, whereas the data package P$_2$ read by the areas Z$_2$ is transferred into the delay line L$_1$. During this period, the data package P$_1$ read by the area Z$_1$ is transferred into the delay line L$_3$ (FIG. 7b).

Figure 7C:
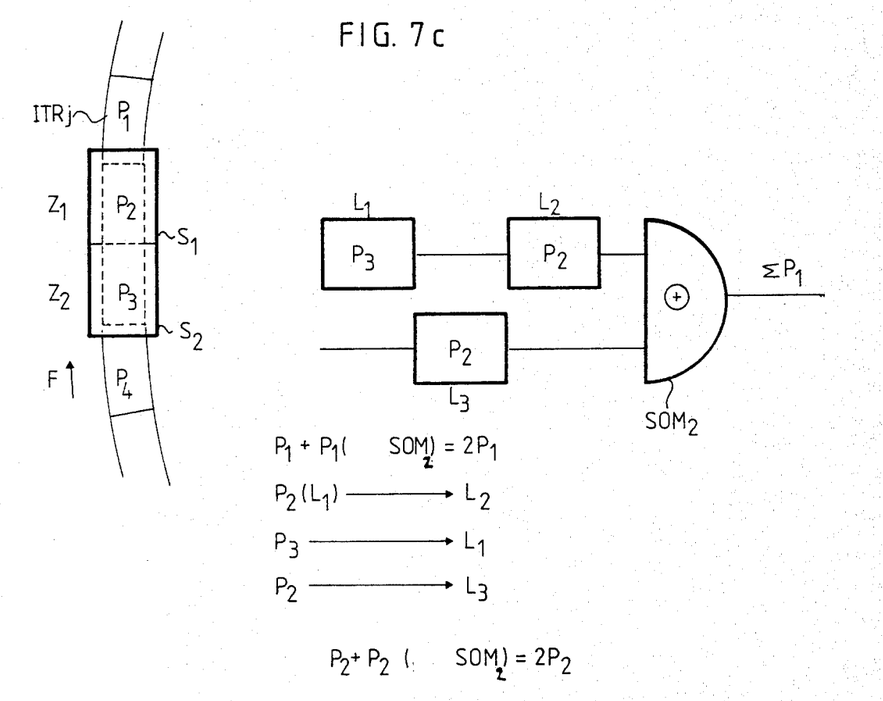

At the sampling instant 3T, the data package P$_1$ assumes the position indicated in FIG. 7c and is no longer located opposite the area Z$_1$. The data package P$_2$ is read by the area Z$_1$, whereas the package P$_3$ is read by the area Z$_2$. The collection of the packages P$_2$ by the area Z$_1$, and P$_3$ by the area Z$_2$ is completed at the instant 4T. At that same instant, the summing element SOM$_2$ performs the summing of the data packages P$_1$ retained in the delay lines L$_2$ and L$_3$ at the instant 2T. Thus, at the output SOM$_2$ the sum $\Sigma P_1 = 2P_1$ is obtained. The data package P$_2$ retained in the delay line L$_1$ at the instant 2T is transferred into the delay line L$_2$, whereas the data package P$_3$ ready by the area Z$_2$ between the instants 2T and 3T is transferred into the delay line L$_1$, while the data package P$_2$ read between these instants 2T and 3T by the area Z$_1$ is transferred into the delay line L$_3$.

Figure 8:
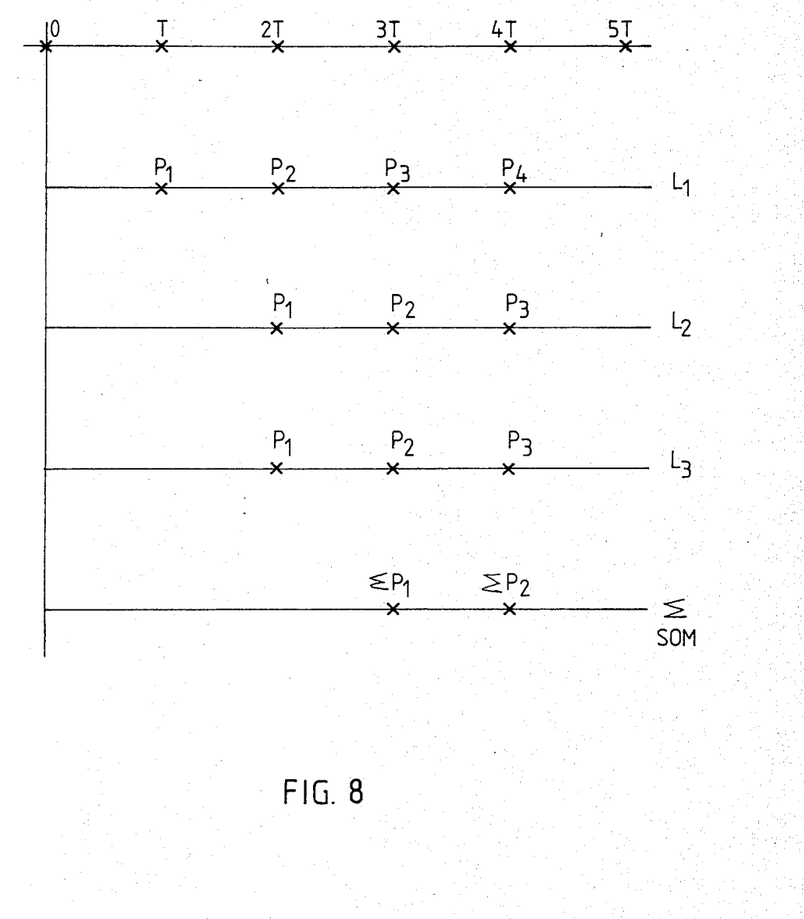

The operation of the device illustrated in FIG. 5 is then performed in a manner identical to that which has just been described. Thus, between the instants 3T and 4T, the data package P$_3$ is collected and read by the area Z$_1$, whereas the package P$_4$ is read by the area Z$_2$. The package P$_4$ is transferred into the delay line L$_1$, whereas the package P$_3$ is transferred into the delay line L$_2$, the package P$_3$ being likewise transferred into the delay line L$_3$ (FIG. 8). At this instant 4T the summing element SOM$_2$ performs the summing $\Sigma P_2 = 2P_2$.

The line of argument which has just been given concerning the description of the preferred embodiment of the circuit according to the invention shown in FIG. 5 could equally be made for the embodiments of this circuit utilizing the redundancy in order to read several times (a number of times greater than two) the same package of N bits on a magnetic disc track. The tables below show the different results which can be obtained in the case of a number of redundancies greater than 2, especially the maximum frequencies of data flow exciting from the device CCD$_2$. This frequency decreases as the number of redundancies increases. Thus, a compromise has to be found between the number of redundancies which permits to increase considerably the signal/noise ratio and the maximum frequency which diminishes as a function of the number of redundancies.

With a shift frequency of 20 MHz, the table I below is obtained:

TABLE I

| Number of redundancy | Size of area | Number of bits per area | Maximum frequency MHz |
|---|---|---|---|
| 1 | 1 024 | 256 | 5 |
| 2 | 512 | 128 | 2.5 |
| 3 | 341 | 85 | 1.6 |
| 4 | 256 | 64 | 1.25 |
| 5 | 204 | 51 | 1 |

With a shift frequency of 50 MHz, the table II below is obtained:

TABLE II

| | | | |
|---|---|---|---|
| 1 | 1 024 | 256 | 10 |
| 2 | 512 | 128 | 5 |
| 3 | 341.3 | 85 | 3.3 |
| 4 | 256 | 64 | 2.5 |
| 5 | 204.8 | 51.2 | 2 |

I claim:

1. An optoelectronic method of reading data retained on a magnetic medium (SM) within a plurality of tracks, comprising receiving the data in the form of a plurality of luminous spots (ID$_i$) which are provided by an optical device which observes simultaneously a plurality of tracks and a plurality of data on each track of the data medium (SM) so as to project an enlarged image in the form of a group of spots (ID$_i$) onto a plane (P) where there are arranged a plurality of photoelectronic transducers (TRPE$_{ij}$) aligned in at least one row (BTRPE$_{ij1}$, BTRPE$_{ij2}$) and whose output signal is a function of the luminous intensity of said spots (ID$_i$), at least two transducers (TRPE$_{ij}$, TRPE$_{(i+1)j}$) being associated with the same spot, and the method being characterized in
- (1) obtaining at specified sampling instants, by means of transducers in the row (BTRPE$_{ij1}$, BTRPE$_{ij2}$), an electrical image of the portion of the track observed by the optical device at these same instants in the form of a plurality of analog pulses (S'TRPE$_{ij}$, S'TRPE$_{(i+1)j}$);
- (2) shifting said analog pulses into a parallel shift register (REGP$_1$, REGP$_2$);
- (3) transferring the data from the parallel shift register to a serial shift register (REGS$_1$, REGS$_2$);
- (4) shifting said data until they have all exited from the serial register (REGS$_1$, REGS$_2$) such as to obtain an analog output signal (SSR$_1$); and
- (5) transforming said analog signal (SSR$_1$) generated by the serial register with a frequency (f$_1$) into a logic signal whose frequency is equal to another frequency (F$_E$) for writing the magnetic data on the tracks of the magnetic medium (SM).

2. A circuit for reading the data retained on a magnetic medium (SM) within a plurality of tracks, the data being received in the form of a plurality of luminous spots which are provided by an optical device which observes simultaneously a plurality of tracks and a plurality of data on each track of the magnetic medium (SM) so as to project an enlarged image in the form of a group of such spots onto a plane (P) where there are arranged a plurality of photoelectronic transducers (TRPE$_{ij}$) aligned in at least one row (BTRPE$_{ij1}$, BTRPE$_{ij2}$), and whose output signal is a function of the luminous intensity of said spots, characterized in that, at least two photoelectronic transducers (TRPE$_{ij}$, TRPE$_{(i+1)j}$) are associated with a luminous spot (ID$_i$) and the circuit comprises:
- a parallel transfer register (REGP$_1$, REGP$_2$) containing at least as many storage locations as the row contains photoelectronic transducers which receives the signals generated by each of the transducers (TRPE$_{ij}$);
- a serial shift register (REGS$_1$, REGS$_2$) containing at least as many storage locations as there are photoelectronic transducers (TRPE$_{ij}$) which receives the data transmitted by said parallel transfer register (REGP$_1$, REGP$_2$);
- a shift clock generating a shift clock signal with a frequency (f$_d$) for shifting the data from the parallel transfer register into the serial register and from one storage location of the parallel transfer register into the serial register and from a storage location of the serial register to the location immediately adjoining;
- an amplifying device which receives the signal (SSR$_1$) generated by serial shift register (REGS$_1$, REGS$_2$) and generates a signal (SSRA$_1$, SSRA$_2$); and
- means for converting the signal (SSRA$_1$) generated by the amplifying device (AMPLI$_1$, AMPLI$_2$) into a logical signal with generated logic bits of data at a frequency equal to the writing frequency (f$_E$) of the data on the data medium (SM).

3. A circuit according to claim 2, wherein the plurality of photoelectronic transducers (BTRPE$_{ij2}$), the parallel register (REGP$_2$), and the serial register (REGS$_2$) are divided into a plurality of areas (Z$_1$, Z$_2$), and comprising, mounted in series between the output of the areas of the serial register (REGS$_2$) and the means for converting the signal (SSRA$_{2.2}$, SSRA$_{2.1}$), a circuit made up of a plurality of OR-gates equal in number to the number of areas, a plurality of delay lines (L$_1$, L$_2$, L$_3$) arranged according to a serial/parallel arrangement comprising as many groups as there are areas, the first group containing as many delay lines as there are areas, and the last group comprising a single delay line, and a summing element (SOM$_2$) which calculates the sum of signals generated by each of the series of delay lines and transmits said sum to the converting means (MT$_2$).

4. A circuit according to claim 2, wherein the plurality of photoelectronic transducers (BTRPE$_{ij1}$—BTRPE$_{ij2}$), the parallel register (REGP$_1$, REGP$_2$), the serial register (REGS$_1$, REGS$_2$) and the shift clock (HD) are formed by a charge-transfer device array.

5. A circuit according to claim 3, wherein the plurality of photoelectronic transducers (BTRPE$_{ij1}$—BTRPE$_{ij2}$), the parallel register (REGP$_1$, REGP$_2$), the serial register (REGS$_1$, REGS$_2$) and the shift clock (HD) are formed by a charge-transfer device array.

* * * * *